Fig.1

S, S' are Representations of the fixed stars

United States Patent Office 3,520,073
Patented July 14, 1970

1

3,520,073
MULTIFUNCTION ASTRONOMICAL
DISPLAY PLANETARIUM
Klaus Baader, 30 Hartelstrasse, 42 Munich, Germany
Continuation-in-part of application Ser. No. 470,079, July 7, 1965. This application Nov. 4, 1968, Ser. No. 773,255
Claims priority, application Germany, July 8, 1964, B 77,589
Int. Cl. G09b 27/06, 27/02
U.S. Cl. 35—45
22 Claims

ABSTRACT OF THE DISCLOSURE

A planetarium capable of displaying astronomical relationships and operations in a selected one of at least two modes, as by permitting a choice among a display similar to that of a star globe, to that of an orrery or tellurion, or to that of a projecting planetarium. This choice is obtained by use of a hollow sphere having a darkened thin wall of such limited light permeability that the wall as viewed from the exterior of the sphere is substantially opaque when no light is emitted from a light source therewithin and is substantially transparent when light is emitted from the light source, together with fixed star representing means on the sphere wall and planet representing means disposed between the centrally located light source and the sphere wall.

---

This application is a continuation-in-part of my earlier filed copending application Ser. No. 470,079 filed July 7, 1965 and entitled "Planetarium," now abandoned.

While a large number of devices have heretofore been used to display and demonstrate astronomical relationships and operations, for the edification and training of observers, such devices are typically specialized toward one particular manner of display. Among these devices are star globes, wherein relationships among the fixed stars are illustrated by star representing means fixed on the surface of a typically opaque globe; orreries wherein the movements of planetary bodies and satellites of our solar system are shown by planet and satellite representing bodies moved relative to each other by gearing arrangements; tellurions wherein the particular relationships between the earth and the sun are demonstrated; and projecting planetariums whereby images representative of astronomical relationships and operations are projected onto an image surface. Perhaps the most familiar of these various devices is the projecting planetarium, and the most common of these may be characterized as being of the "bright image" type wherein points of light are projected onto a screen as representations of fixed stars.

On recognizing the specialized purposes for which each of these devices has been developed, it has been discovered that training an observer is best accomplished by providing the capability of displaying astronomical relationships and operations in more than a single, specialized, way. Desirably, the use of a device capable of representing such relationships in more than a single way permits a significant reduction in the number of pieces of equipment required to present a meaningful illustration of astronomical information.

It is accordingly an object of the present invention to provide an instrument which presents an accurate representation of a large number of astronomical relationships and operations through simple means and which provides a user with the opportunity of selecting an appropriate means for display for the particular relationships and operations of interest at the moment. In accomplishing this object of the present invention, advantage is taken of the variations in visual effects attainable with a darkened thin wall of predetermined, limited, light permeability characterstcs. In partcular, a device in accordance with the present invention incorporates a hollow sphere of thin wall construction such that the thin wall, when opposing surfaces thereof are lighted at disparate levels of illumination, is substantially transparent from the surface of lower incident light and substantially opaque from the surface of higher incident light. By arranging star representing means on the thin wall hollow sphere and sun and planet representing means therewithin and by providing for controlled illumination of the sun representing means within the hollow sphere, a user is presented with a choice between use of the device as a star globe and use of the device as an orrery, tellurion or projecting planetarium.

A further object of the present invention is to provide a device of the type generally described above wherein solar system operations are shown against a representation of the solar system aspect of the fixed stars. In realizing this object of the present invention, a planet representing body is supported within the hollow sphere and driven in a manner corresponding to the movement of the earth, while at the same time a body representing the moon is driven along a path corresponding to the path of the moon about the earth. Such movement of the planet and satellite representing bodies is obtained through the use of a particular gearing arrangement, discussed more fully hereinafter.

Yet a further object of the present invention is to provide a projecting planetarium of the "dark image" type wherein representations of the fixed stars and planetary orbits against the fixed stars may be projected onto a projection surface as dark images against a light background. In realizing this object of the present invention, provision is made for the use, at the sun representing means location within the hollow sphere, of a light source which emits light from a very small volume. The positioning of a light source approximating a point source at the center of the hollow sphere casts shadows or dark images of opaque star and planet representing means outwardly of the thin wall hollow sphere and thus onto a projection surface.

Yet another specific object of the present invention is the projection of astrological star group symbols through the use of a plurality of transparent adhesive films which may be detachably fixed on the exterior of the hollow sphere and which include symbolic representations of the astrological symbols for groups of stars. In realizing this object of the present invention, it is particularly advantageous to design the transparent films in a way such that they can be put together in the manner of a jigsaw puzzle, and with star connecting lines which coincide with the corresponding star representing means provided on the hollow sphere.

Some of the objects and advantages of the invention having been stated, others will appear as the description proceeds, when taken in connection with the accompanying drawings, in which—

FIG. 3 is an enlarged elevation, in section, through a portion of a gearing arrangement of the present invention which provides support and movement of a planet representing body and a satellite representing body;

FIG. 4 is a plan view, in partial section, through the gearing arrangement of FIG. 3, taken generally along the line 4—4 of FIG. 3 and including a line 3—3 indicating the manner in which FIG. 3 is taken;

Referring now more particularly to the drawings, a first form of astronomical display device or apparatus in accordance with the present invention (FIGS. 1–4) includes a hollow sphere indicated generally at 1 which comprises two hemispheres 2 and 3 which abut each other and mate along an equator line 4 of the sphere. The lower hemisphere 3 is provided with a circular band or ring 5 within the hemisphere, in order to provide for frictional securement of the hemispheres in the assembled, abutting, relationship. While it is recognized that the device or apparatus provides displays of more varied types than have heretofore been attainable with those devices known as planetaria, the term "planetarium" as herein used refers to a device capable of presenting at least a star globe display and one other display such as that of an orrery or projecting planetarium.

Each of the hemispheres 2 and 3 is of thin wall construction and is so constructed that the thin wall is darkened and has a predetermined limited light permeability characteristic. In accordance with the present invention, the limited light permeability characteristic of the darkened thin wall is such as to render the wall, when opposing surfaces thereof are lighted at disparate levels of illumination, substantially transparent from the surface of lower incident light and substantially opaque from the surface of higher incident light. While it is believed that such a characteristic will be obtained where the light permeability characteristic of the darkened thin wall is less than seventy percent, it is recognized that similar effects are also obtained at very low levels of light permeability such as, for example, five hundredths percent. It is preferred that the light permeability of the darkened thin wall be within a range of from about two percent to about fifteen percent, with a commercially acceptable result being obtained at the lower limit of that range. As herein used, the term "light permeability" is a correlative of light absorption and light reflectivity, in that a darkened thin wall having a light permeability of two percent may be said to have a light absorption and light reflectivity of ninety-eight percent.

A satisfactory material for use as the darkened thin wall of the hemispheres 2 and 3 is polymethacrylate colored to a dark blue or grey shade, with a neutral grey being preferred in order to avoid distortion of color balances. Alternatives to the use of a coloring agent in polymethacrylate include injection molding of the hemispheres 2 and 3 from polystyrene, polyvinylchloride, or some other synthetic material with darkening by vapor deposition of thin metallic films or by the application of photographic films.

Specifically, alternative hemispheres 2′, 2″, and 3′, 3″ (FIG. 8) may be provided by assembling outer hemispherical shells 2′ and 3′ with inner hemispherical shells 2″ and 3″. Where such an approach is employed, only one set of the shells need necessarily be darkened, such as the outer hemispherical shells 2′ and 3′.

As shown by upper and lower hemispheric shells 2‴ and 3‴, respectively, (FIG. 9), a secondary layer L may be applied to obtain the darkening of the thin wall of the hollow sphere.

Supported within the hollow sphere 1 is a sun representing means generally indicated at 6, mounted at the upper terminal extremity of a stationary supporting tube 7. The stationary supporting tube 7 extends through a gearing housing 8′ (FIG. 2) within which is mounted a speed reducer drive gearing 8. The tube 7 and housing 8′ are fixed within the sphere 1 by penetration of the lower hemisphere 3 and by means of a nut 9, a washer 10, and two rings 11 and 12. By securement of the nut 9 to a threaded lower end portion of the supporting tube 7, the tube and elements supported thereby are secured in operating position within the sphere 1.

To provide illumination for the interior of the sphere 1, and thereby permit viewing solar system operations or projecting dark images as described more fully hereinafter, the sun representing means includes a controllable light source means in the form of an electrical lamp 13. The lamp envelope may be white or colored, as desired, but in any instance the filament thereof emits light from a relatively small volume so as to approximate a point source. The lamp 13 is enclosed by a diffusing means, preferably a removable hollow sphere 13′ of white opal glass or plastic. With the diffuser in position enclosing the electrical lamp 13, light emitted therefrom originates from a relatively large volume at the center of the sphere 1, providing an even and diffuse illumination for the interior of the sphere. While the enclosure of the lamp 13 with a diffusing cover has been illustrated, it is understood that the lamp envelope properly may be constructed as a diffuser, thereby avoiding the necessity of providing an additional removable sphere.

Where desired for representing sun spots or floating gas masses on the surface of the sun, the diffuser or lamp envelope may have grey, black or colored spots or lines of paint thereon.

In addition to the sun representing means 6, the planetarium includes a spherical planet representing body 14 carried by a supporting arm 16 preferably formed as a hollow tube and which is firmly secured through a cap 18 to a rotating supporting tube 20. The rotating tube 20 is coaxial with the stationary tube 7 and is driven in rotation about its longitudinal axis by means of the speed reducer drive gearing 8, for moving the planet body 14 along an orbit 23 about the sun representing means 6. Motive power for movement of the planet body 14 is provided by an electric motor 22, operatively connected to the speed reducer drive gearing.

On rotation of the rotating tube 20, a flexible shaft 26 (FIG. 2) is driven in rotation by the engagement of a driven pinion 24 with stationary toothed rim 28, formed on an end ring 29 of a stationary tube 30 which is rigidly attached to the gearing housing 8′. Rotation of the flexible shaft 26 in coordination with movement of the planet body 14 along its orbit 23 passes motive power to a gearing arrangement generally identified at 32, which is operative to cause rotation of the planet body 14 about its axis 34 and to cause movement of a satellite representing body 36 about the planet body 14 as discussed in greater detail below.

In order to supply electrical current to the lamp 13, a first conductor 55 extends through the interior of the tube 7 to a socket mounted adjacent the upper extremity thereof. Additionally, a second conductor 56 extends from the stationary supporting tube 7 above the cap 18 mounted thereon and is connected to a slide ring 57. Voltage present on the second conductor 56 and the slide ring 57 passes to a slide contact 58 and a third conductor 56′ extending along the supporting arm 16 to the gearing arrangement 32, from whence the voltage is available to the planet body 14, in order to allow the positioning of an electric lamp therewithin if so desired.

For ready use of the apparatus of the present invention, the hollow sphere 1 is supported by a base having an outer surface 62 which defines a spherical zone and is bent inwardly at its upper edges 64 into a bowl-like depression. The curved edge 64 serves as a support for the hollow sphere 1 and it is therefore possible to pivot the hollow sphere 1 about any selected axis and, especially, to change the inclination of the orbit 23 of the earth representing body 14 with respect to the horizontal plane at the location of use of the apparatus.

Operative connection of the electrical motor 22 and the lamp 13 with a source of electrical current, without interference with pivoting movement of the hollow sphere 1 over as great an angular range as possible, is provided by means of a relatively long cable 54. Moreover, the upper edge 64 of the base 60 preferably is provided with recesses or depressions at one or several places so as to accommodate various positionings of the cable 54 and the fastening means for the supporting tube 7.

A switch box 66 is formed integrally with the base 60 and is provided with a pushbutton panel 68 including switch means operatively connected by the cable 54 with the electrical motor 22 and the electrical lamp 13 for controlling the emission of light and the movement of the planet body 14. The switch box 66 is supplied with electrical current through a connecting cable 69 and the current preferably is reduced to the voltage required for driving the electric motor 22 by means of a transformer and rectified by a rectifier. The voltage level of the electric current applied to the motor 22 and the lamp 13 preferably is varied by means of adjustable potentiometers (not shown).

An accurate adjustment of the position of the sun representing means 6 at the center of the hollow sphere 1 is required in order to avoid reflection of disturbing images of the sun by the inner surface of the hollow sphere. In accordance with the present invention, such an adjustment is accomplished by mounting the diffuser for the sun representing means 6 on a ring 70 of rubber or synthetic resin which is frictionally retained on the stationary supporting tube 7 and may be displaced up and down the supporting tube 7 as indicated by the double arrows 72 in FIG. 2. Further, tilting of the supporting tube 7 with respect to the hollow sphere 1 is accomplished by displacing the rubber mounting ring 12 as indicated by the arrows 73 or 74.

The gearing arrangement 32 (FIGS. 3 and 4) which coordinates movement of the planet and satellite bodies 14 and 36 is secured on the supporting arm 16 by means of a connecting piece 80, which in turn is fixed to a gearing base plate 81. By means of four nuts 82, 83, 84 and 85 and spacer sleeves, two intermediate plates 86 and 87 are held above the base plate 81. The flexible shaft 26 is firmly secured to a pinion 88, which meshes with a gear 89 that is keyed to a through-shaft 90 together with a pinion 91, meshing with a gear 93 fixed on a first intermediate shaft 92. Moreover, a pinion 94 is keyed to this intermediate shaft 92 and meshes with a gear 95 which is fixed on a second intermediate shaft 96. The position of the shafts 90, 92 and 96 with respect to each other is best evident from FIG. 4. In addition to gear 95, a first pinion 97 and a second pinion 98 are keyed to the second intermediate shaft 96. The first pinion 97 meshes with a gear 99 which is freely rotatable about shaft 90 and the second pinion 98 meshes with a gear 100 which is freely rotatable about the attachment 99' of gear 99. A carrier member 101 is firmly secured to gear 100 and has a supporting ring 102 serving as an auxiliary moon path riveted to it. A movable ring 103 is mounted in the supporting ring 102 and is provided with an inner toothed rim 104 and carries the satellite body 36 on a rod 36'. The toothed rim 104 meshes with a gear 105 which together with a pinion 106 is rotatably mounted on the sleeve-shaped attachment 99' of the gear 99. Pinion 106 meshes with a gear 107, which is connected to a gear 109. via a shaft 108. The gear 109 meshes with a gear 110 keyed to the upper end of the through-shaft 90 and with a gear 111 which together with a holding sleeve 112 serving to mount the planet body 14 rotates about a sleeve 113, which is fixed at a supporting arm 114, which is secured in a pressed fit to the upper end of the sleeve-shaped attachment 99' of the gear 99.

Figures 3, 4:
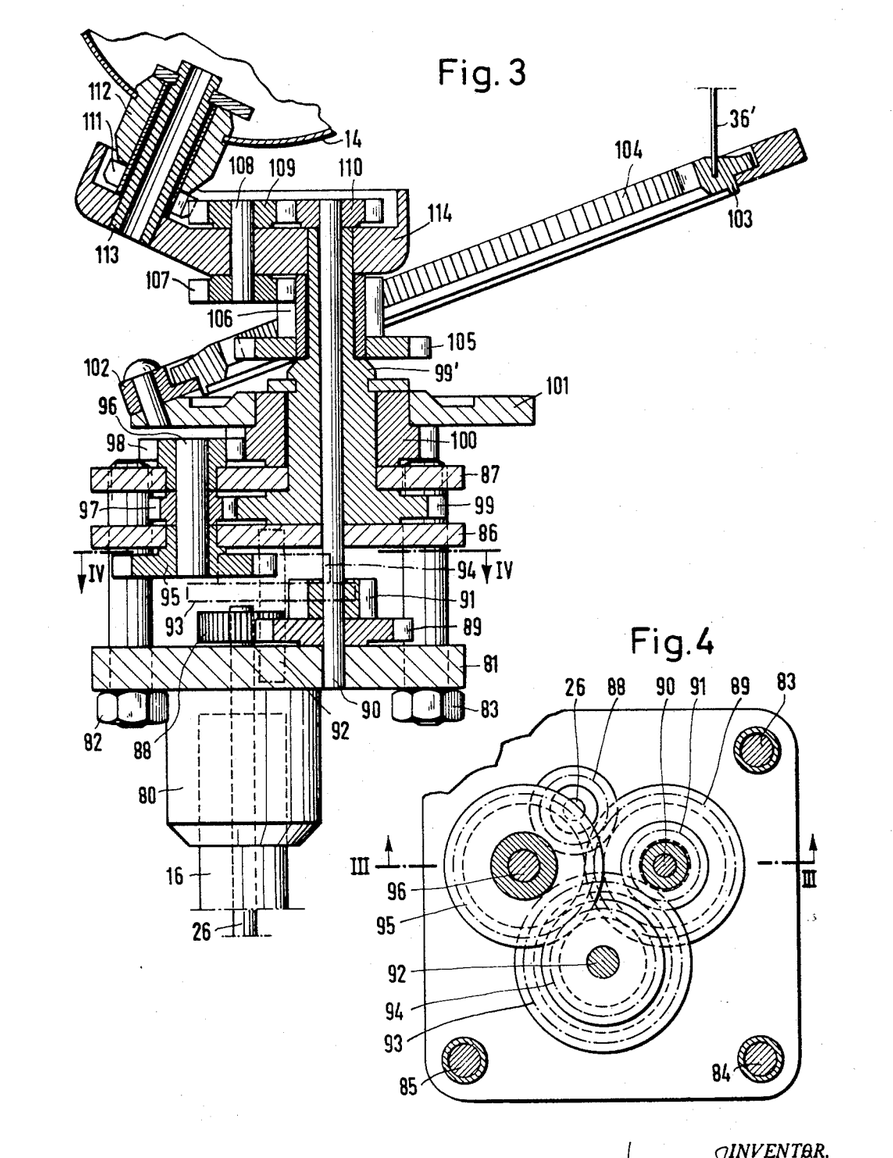

The auxiliary path of the supporting ring 102 and, thus, also the orbit of the satellite body 36 is shown in an exaggerated inclined position so that the great distance between the moon and the earth which exists in nature and is difficult to show in a planetarium for lack of space, becomes somewhat clear. The shadows of the moon travel in the natural sense and display their natural course. Due to the travel of the nodes of the moon's orbit about the earth, which are properly represented in the planetarium of this invention, the course of the lunar and solar eclipses is represented in the cycle of the travelling nodes.

The gearing 32 comprises substantially two power paths. The first power path, which furnishes the rapid movements, comprises the through-shaft 90 and effects on one hand, through the gears 110, 109 and 111, the rotational movement of the planet body 14 about its own axis, and on the other hand, through gears 107, 108 and 105, the movement of the satellite body about the planet body. The second power path furnishes the slower movements and comprises the first intermediate shaft 92 with gears 93, 94 and the second intermediate shaft 96 with gears 95, 97, 98.

Through this second power path gear 99 is driven, on the attachment 99' of which the supporting arm 114 carrying the planet body axis is fixed. Moreover, the second power path drives gear 100 which supports the carrier member 101, on which the supporting ring 102 for the satellite body is mounted. The movement of the gear 100 causes the nodal travel of the moon's path.

In the gearing 32 the numbers of the teeth of the gears are so chosen that the planet body 14 rotates twelve times about its own axis relative to the sun during one revolution about the sun, and that the satellite body 36, during one revolution of the planet about the sun, moves three times about the planet and that during three revolutions of the planet about the sun the auxiliary path of the satellite moves about the planet once. Thus, the normal movements of our Earth and Moon are represented. Of course the number of revolutions may also be chosen in a different way.

Figure 1:
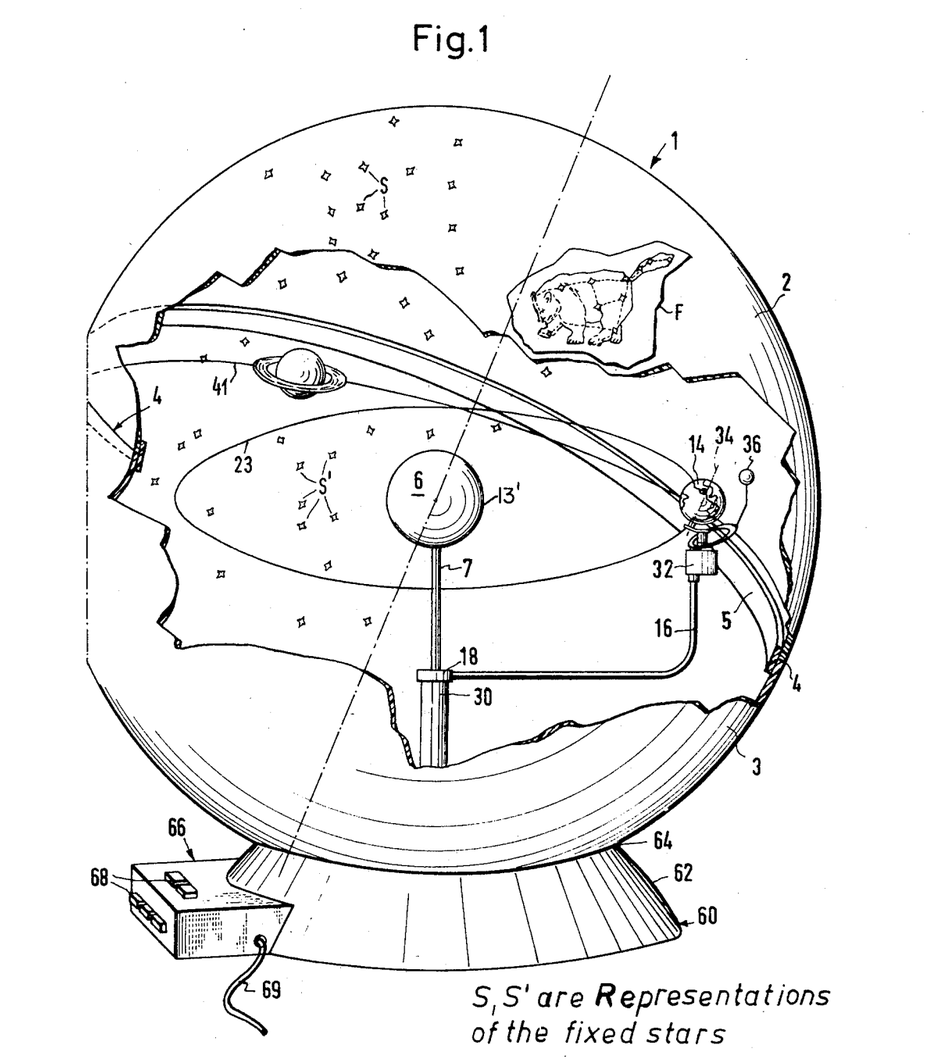
FIG. 1 is a perspective view of a planetarium of the present invention, partly broken away to illustrate certain features thereof.
Figure 2:
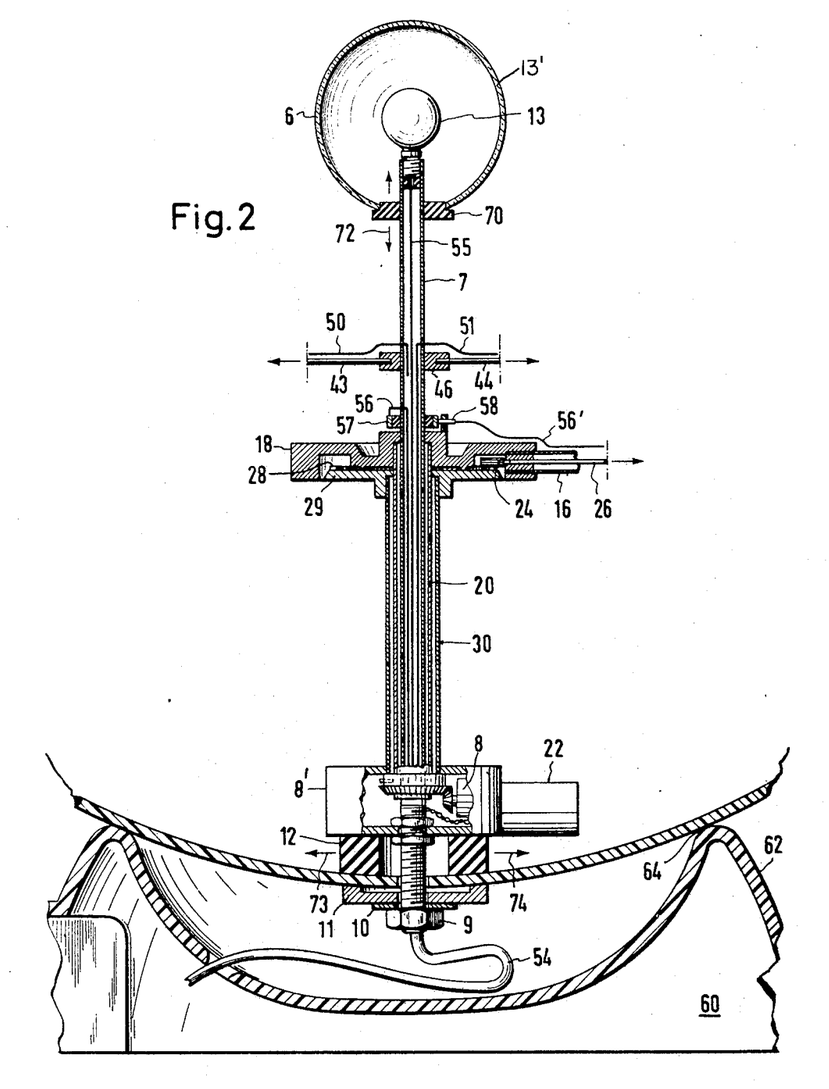
FIG. 2 is an enlarged elevation, in partial section, through a portion of the planetarium of FIG. 1.
Figures 8, 9:
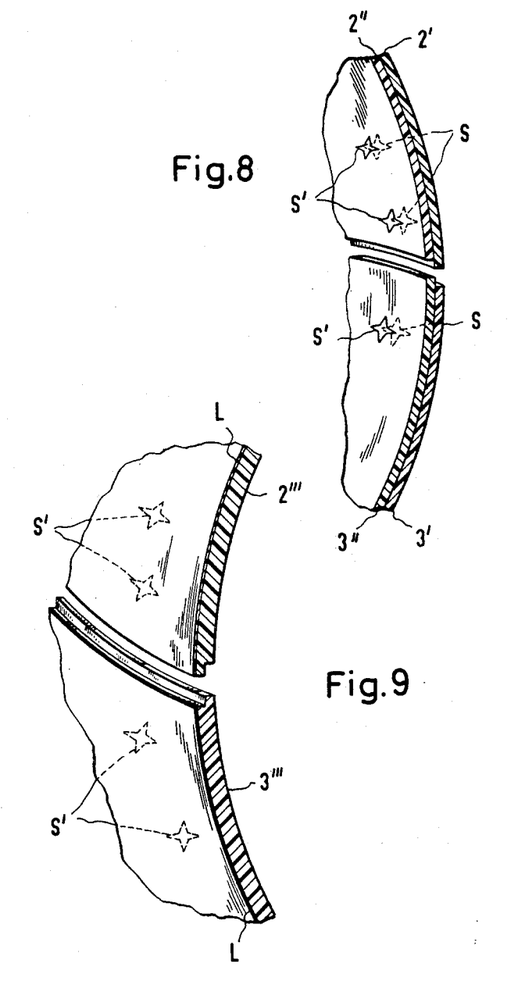
FIGS. 8 and 9 are perspective views, in partial section, through portions of hollow spheres for the planetarium of the present invention.

In order to present representations of the fixed stars to an observer of the planetarium of this invention, opaque means S and S' are preferably provided on the exterior and interior surfaces of the hemispheres 2 and 3, by hand painting or printing the plastic materials from which the hemispheres 2 and 3 are formed. It is preferred that both representations S and S' be incorporated (as shown in FIGS. 1 and 8), and that they be arranged with star representing portions thereof coincident on the inner and outer surfaces of the thin wall of the hollow sphere 1 (as in FIG. 8). When so arranged, the star representing means S on the outer surface of the hollow sphere is the representation which will be noted when the inner surface of the thin wall of the hollow sphere is not illuminated. This result flows from the darkening of the thin wall of the hollow sphere 1 and the limited light permeability characteristics thereof, which cause the globe to have the appearance of an opaque, black, solid sphere. In this use, the planetarium of the present invention serves a function corresponding to that of a star globe and it may be preferred that the representation S on the exterior of the hemispheres 2 and 3 be printed in multiple colors.

The representation S' on the inner surface of the hemispheres 2 and 3, when provided, gives a field against which movements of the planet representing body 14 are observed, so that solar system operations are viewed against a solar system aspect of the fixed stars. For this purpose, it is preferred that the representation S' be printed in a single color, such as white, and that the representation include not only portions indicative of the fixed stars but also markings indicative of the orbits of planets not represented by moving planet bodies and astronomical lines of reference. The representation S' is visible to an observer when the level of illumination within the hollow sphere 1 is greater than the illumination impinging thereon from outside the planetarium. Upon this occurrence, an observer viewing the planetarium receives the impressions that the portion of this sphere most closely adjacent to him is transparent, permitting him to see into the planetarium, while the portion of the wall most remote from him is opaque.

In viewing the movement of the earth and moon relative to the sun, use of the planetarium as a tellurion is facilitated by removal of the upper hemisphere 2, to provide a clearer view of the planet representing body 14 and the satellite representing body 36. Preferably, in order to facilitate such a view, the parting line 4 of the upper and lower hemispheres 2 and 3 is at an angle of approximately 23° to the plane of the orbit of the earth representing body 14.

While not required for effective use of the planetarium, it is desirable in certain instances to employ fluorescent or phosphorescent pigment for the paints or inks of the representation S' on the inner surface of the hemispheres 2 and 3. By the use of such materials, and of a light source emitting light of such wave lengths as to activate the pigment materials, the more marked contrast may be obtained for the representations of the fixed stars and the planetary orbits.

Where desired in order to illustrate astrological groupings of the fixed stars, the present invention provides a plurality of overlays F for use in conjunction with the hemispheres 2 and 3. Preferably, the overlays F are formed of a transparent sheet plastic material which may be readily secured to the exterior surface of the hemisphere 2 by being spread thereupon. In any event, the overlays F are provided with a series of lines for interconnecting selected ones of fixed star representing means S on the exterior surface of the hemispheres 2 and 3 and preferably include an outline representative of the astrological symbol, such as Ursa Major or Ursa Minor. In view of the number of astrological symbols which have been applied to groupings of stars, it is contemplated by the present invention that a large number of overlays F will be provided, and that the individual overlays be constructed as to fit together over the surface of the hemispheres 2 and 3 in a manner similar to a jigsaw puzzle. Thus, all or a selected few of the astrological groupings may be displayed as desired.

Further, it is recognized that one or the other of the representations S and S' of the fixed stars may be eliminated if the corresponding display function is not required. Thus, if it is not contemplated that the planetarium of the present invention would be employed as a star globe, the representation S on the outer surface of the hemispheres 2 and 3 may be omitted (as shown in FIG. 9).

While the operation of the planetarium of the present invention may be understood from the discussion above, it is believed appropriate to briefly review the same in order to insure that the features thereof are clear. On assembling the apparatus of the present invention and placing the same on display in a lighted room, an observer will note that, prior to the application of electrical current to the electrical lamp 13 within the sun representing means 6, the hemispheres 2 and 3 give the appearance of being an opaque, black, globe having the star representing means S visible on the exterior surface thereof. The observer is thus provided with a star globe illustrating a universal aspect of the fixed stars. On operating the pushbutton switches 67 to energize the electrical lamp 13 within the sun representing means 6, and adjusting the level of illumination within the globe to be greater than that present in the room where the apparatus is on display, the observer will note that the portion of the thin wall most closely adjacent him appears to become transparent, permitting him to see the planet representing body 14 and satellite representing body 36 located within the hollow thin wall sphere and to view the internal representation of the fixed stars S' against the darkened and apparently opaque, black, surface of the remote portion of the sphere. The observer may then energize the drive motor 22 to cause movement of the earth representing body 14 about the sun representing means and movement of the satellite representing body 36 about the planet body, thereby simulating solar system operations of the earth and its satellites. Such operation permits observance of the relative positions of the sun, earth, and the fixed stars at various seasons of the year as well as observation of the effects of night, day and the passage of time on the phases of the moon. If so desired, the upper hemisphere 2 may be removed by the observer, in order to permit obtaining a clearer view of such planetary operations.

If desired, the observer may then remove from the exterior of the lamp 13 the diffusing cover 13' which normally encloses the same. On replacing the upper hemisphere 2, the observer will then note shadow or dark image projection outwardly of the surface of the sphere 1 of images of the fixed star representing means S and S' and of the planet and satellite bodies 14 and 36. Such shadow image projections, which are particularly noticeable in an absolutely darkened room, appear against a light field and result from the emission of light from a relatively small volume within the envelope of the lamp 13, in approximation to the emission of light from a point source.

The present invention further contemplates certain modifications in the manner in which planet and satellite representing bodies may be supported within the hollow sphere 1. In a first such modified form (FIG. 5) the planet representing body 14 is movable along a ring 140 fixed to the inner wall of the hollow sphere 1' and preferably constructed of a transparent plastic material. This supporting ring 140 is provided with a dovetail guiding groove 141, in which a gearing casing 142 having a dovetail tongue 143 is slidably mounted. A drive motor 144 is mounted in the gear casing 142 and has a shaft 145 carrying a drive gear 146 which meshes with a toothed portion 147 extending around the ring 140 in order to drive the gearing casing 142 and the planet representing body 14 along the ring 140. Preferably, the ring 140 is inclined in accordance with the inclination of the ecliptic, i.e. the plane of the orbit of the earth, against the equator of the representation of the fixed stars applied to the hollow sphere 1'. Operating voltage is supplied to the drive motor 144 through appropriate slide contacts (not shown).

Figure 5:
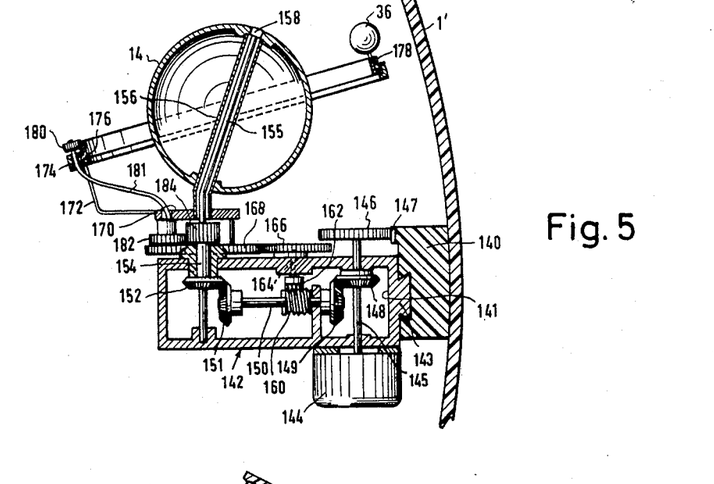
FIGS. 5 and 6 are respectively an elevation view, in partial section, and a perspective view through modified forms of gearing arrangements for the apparatus for the present invention, providing alternatives for the support and movement of planet and satellite representing bodies.

Motive power is additionally passed from the drive motor 144 to a shaft 150 through a pair of bevel gears 148 and 149, and also drives a second shaft 154 through a further pair of beveled gears 151 and 152. At the upper end of the second shaft 154 is fixed a flexible shaft 155, which extends to a bent tubular member 156 on which a hollow spherical planet representing body 14 is rotatably mounted. In order to insure rotation of the planet representing body 14 together with the flexible shaft 55, a key portion 158 is fixed at the end of the flexible shaft.

In order to drive a satellite representing body 36 in movement about the planet representing body 14, motive power is passed from the motor 144 through a drive train including a worm 160 mounted on the shaft 150 for rotation therewith and for meshing engagement with a gear 162, to a driven gear 166 through a shaft 164. The gear 166 meshes with another gear 168 rotatably mounted on the shaft 154 to which is rigidly fixed a supporting plate 170 which supports a ring 174 through the use of a carrier bracket 172. A second ring 176 is rotatably mounted on the first ring 174 and carries the satellite representing body 36 in movement along its orbit about the planet representing body 14.

The second ring 176 is driven in rotation by the interconnection of the driving gear 180 with a toothed portion 178 of the second ring 176. The driving gear 180 is connected through a flexible shaft 181 to a gear 182 mounted eccentrically on the gear 168 and meshing with the gear 184 which is fixed on the shaft 154.

The gearing arrangement of FIG. 5, described immediately above, furnishes movement of the planet representing body 14 along the path of revolution within the thin wall hollow sphere 1' and determined by the ring 140 as well as controlling the rotation of the planet representing body 14 about the axis defined by the shaft 156, the revolution of the satellite representing means 36 about the planet representing body 14 and, by a single counterrevolution of the gear 158 during one revolution of the planet representing body 14 around the annular path 140, maintains a constant position of the axis of rotation of the planet representing body in space. While the gearing 142 is disclosed with particular reference to use in conjunction with a planet representing body symbolizing the earth, it is to be recognized that the gearing may also serve a body representative of some other planet in the solar system.

Figure 6:
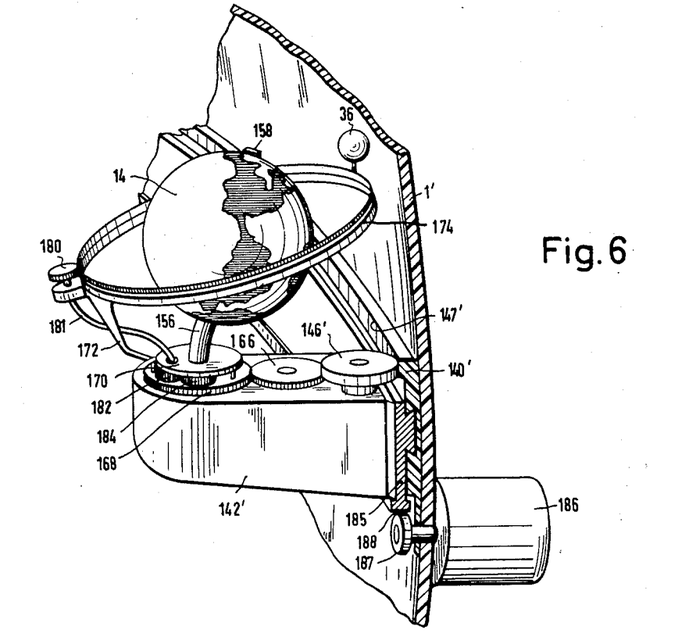
Figure 7:
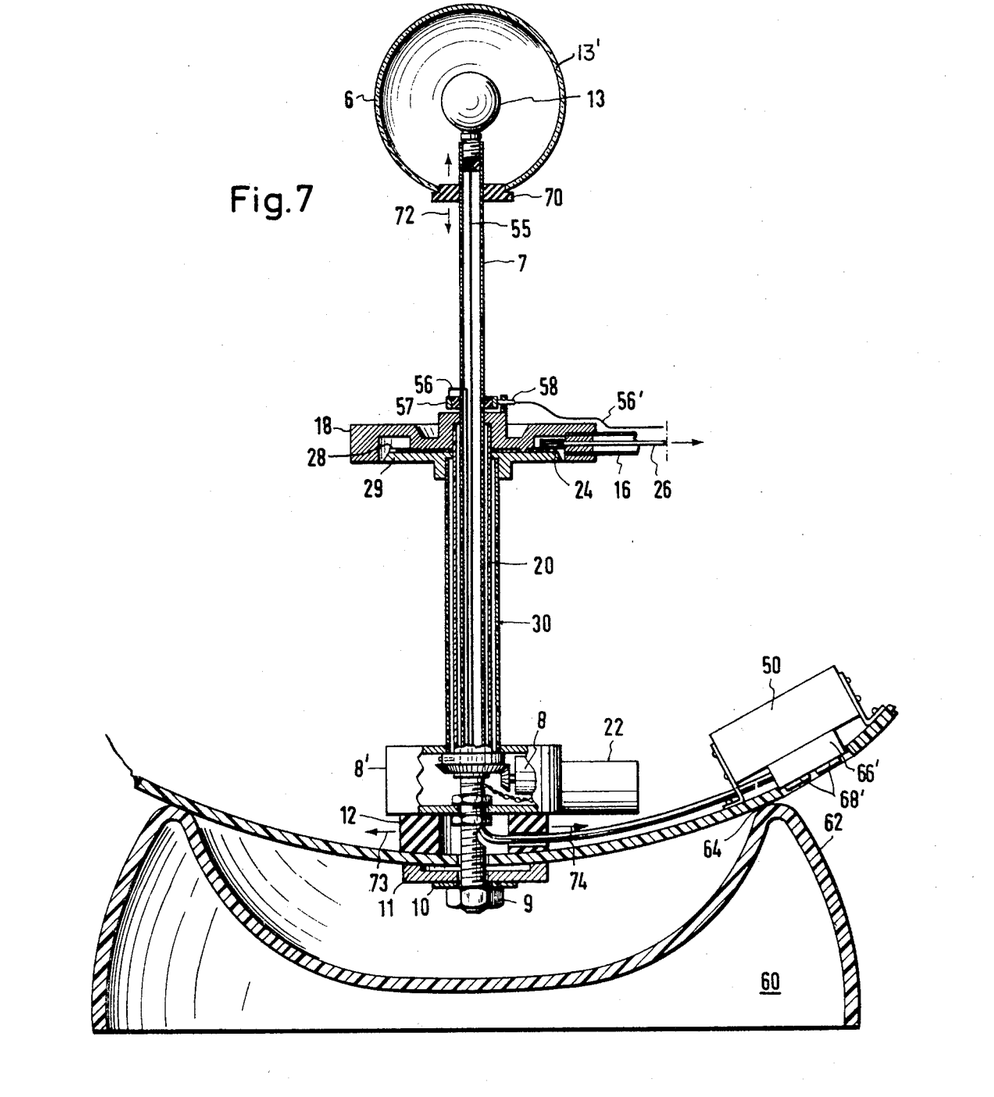
FIG. 7 is a view similar to FIG. 2 illustrating a modification of the planetarium of the present invention.

Still a further modification of drive arrangements useful with the present invention is illustrated in FIG. 6. In this third form, the gearing casing 142' and the drive trains provided therein are similar to those illustrated n FIG. 5. The distinction between the forms of FIGS. 5 and 6 lies in the use, in the form of FIG. 6, of a stationary motor 186 to drive a movable ring 185 in rotation relative to the stationary ring 140' which is firmly connected to the hollow thin wall sphere 1'. Motive power is transmitted from the motor 186 to the rotating ring 185 by means of a friction roller 187 which engages the friction surface 188 of a lower edge of the movable ring 185, while rotation of the gearing arrangement within the gearing casing 142 is obtained by engagement between a friction roller 146' which runs along the friction surface 147' of the ring 140.

In brief conclusion, it is believed apparent that an astronomical display device has been disclosed which is subject to use in a number of different ways, at the election of an observer or operator of the device. At the observer's option, the device of the present invention may be employed as a start globe, as an orrery or tellurion, or as a dark image projecting planetarium. The multiplicity of functions are available through the cooperation, in the device of this invention, of a thin wall hollow sphere of particular light permeability characteristics, the provision of control over an electrical lamp located therewithin, and the use of opaque representations of the fixed stars and planets and satellites.

In the drawings and specification, there have been set forth preferred embodiments of the invention, and although specific terms are employed, they are used in a generic and descriptive sense only and not for purposes of limitation.

I claim:

1. A planetarium adapted to optionally illustrate a view of a universal aspect of the fixed stars and a view of solar system operations and illumination against a solar system aspect of the fixed stars comprising:
    a hollow sphere having a darkened thin wall with predetermined limited light permeability characteristics rendering said wall, when opposing surfaces thereof are lighted with disparate levels of illumination, substantially transparent from the surface of lower incident light and substantially opaque from the surface of higher incident light,
    opaque means on the inner surface of said sphere wall representing a solar system aspect of the fixed stars,
    opaque means on the outer surface of said sphere wall representing a universal aspect of the fixed stars,
    means supported centrally of said sphere for representing the sun and including a controllable light source means,
    control means operatively connected to said light source means for controlling the emission of light therefrom,
    a body representing a planet,
    means for supporting said body within said sphere intermediate said wall and said sun representing means and for controllably moving said body along a predetermined path of travel about said sun representing means, and
    control means operatively connected to said body supporting and moving means for controlling the movement of said planet representing body thereby,
    the limited permeability of said wall being such that said wall as viewed from the exterior of said sphere is substantially opaque when no light is emitted from said light source means and said outer surface opaque star representing means thereby illustrates a universal aspect of the fixed stars and said wall is substantially transparent when light is emitted from said light source means and said inner surface opaque star representing means and said planet representing body thereby illustrate solar system operations and illumination against a solar system aspect of the fixed stars.

2. A planetarium as claimed in claim 1, wherein said star representing means on the outer and inner surfaces of said thin wall coincide to define a single coordinated aspect.

3. A planetarium as claimed in claim 1, wherein said star representing means on the outer and inner surfaces of said thin wall deviate to define two different aspects.

4. A planetarium adapted to optionally illustrate a selected one of three views, namely a view of a universal aspect of the fixed stars, a view of solar system operations and illumination against a solar system aspect of the fixed stars, and a projected view of such operations and aspect as shadow images against a light field on a projection surface, the planetarium comprising:
    a hollow sphere having a darkened thin wall with predetermined limited light permeability characteristics rendering said wall, when opposing surfaces thereof are lighted with disparate levels of illumination, substantially transparent from the surface of lower incident light and substantially opaque from the surface of higher incident light,
    means on at least one surface of said sphere wall representing the fixed stars,
    means supported centrally of said sphere representing the sun and including a controllable light source means and a diffusing cover normally positioned enclosing said light source means, said light source means emitting light from a relatively small volume so as to approximate a point source,
    a body representing a planet,
    means for supporting said planet representing body within said sphere intermediate said wall and said sun representing means and for controllably moving said planet representing body along a predetermined path of travel about said sun representing means, and
    means for controlling the emission of light from said light source means and the movement of said planet representing body by said supporting and moving means,
    the limited light permeability of said wall being such that said sphere, when no light is emitted from said light source means and as viewed from the exterior, gives the impression of a black substantially opaque globe and said star representing means thereby illustrates a universal aspect of the fixed stars; said wall being substantially transparent when light is emitted from said light source means so that said star representing means and said planet representing body illustrate solar system operations and illumination against a solar system aspect of the fixed stars; and said light source means, when said diffusing cover is removed therefrom, projects shadow images of elements interposed between said exposed light source means and the exterior of said sphere outwardly of said sphere.

5. A planetarium as claimed in claim 4 wherein said predetermined characteristics are such that the light permeability of said thin wall is within a range of from about 2% to about 15%.

6. A planetarium as claimed in claim 4, wherein said thin wall consists of a plurality of concentric layers, at least one of which is only partially permeable to light.

7. A planetarium as claimed in claim 6, wherein said thin wall is formed of a transparent plastic material and said at least one layer is a layer of vapor deposited material.

8. A planetarium as claimed in claim 6, wherein said thin wall is formed of a transparent plastic material and said at least one layer is a photographic film.

9. A planetarium as claimed in claim 4 and further comprising a plurality of adhesive films each having at least one symbolic representation of a star group and the like thereon and being adapted to be detachably applied to the hollow sphere.

10. A planetarium as claimed in claim 9, wherein each of said adhesive films has star connecting lines thereon corresponding to at least one predetermined symbolic representation and which coincide with the representation of the fixed stars on the hollow sphere upon adherence of said films thereto.

11. A planetarium as claimed in claim 9, in which the adhesive films can be joined to each other on the hollow sphere.

12. A planetarium as claimed in claim 4, wherein said star representing means is applied in fluorescent or phosphorescent color to said at least one surface.

13. A planetarium as claimed in claim 4, further comprising fluorescent color means on the inner surface of said thin wall for representing the orbital paths of planets other than that planet represented by said first body.

14. A planetarium as claimed in claim 4, further comprising means supporting said sun representing means for accurate adjustment thereof to the center of said hollow sphere.

15. A planetarium as claimed in claim 4, wherein the hollow sphere comprises a separable portion which may be removed during operation of said solar system permitting a close observation of the function of said solar system.

16. A planetarium as claimed in claim 4 wherein said light source means and said planet moving means are electrically energizable and said control means includes switch means for controlling the flow of electric current and adapted for electrical connection for a source of electrical energy, said planetarium further comprising a base supporting said hollow sphere for rotation about any axis and having said switch means mounted therein and cable means extending between said sphere and said base for electrically interconnecting said switch means to said light source means and said planet moving means, said cable means being a sufficient length to permit free movement of said sphere on said base.

17. A planetarium as claimed in claim 4 wherein said light source means and said planet moving means are electrically energizable and said control means includes switch means for controlling the flow of electric current and adapted for electrical connection for a source of electrical energy, said planetarium further comprising an electrical energy source means mounted within said sphere, said switch means being mounted within and accessible from without said sphere for selectively electrically connecting said energy source means to said light source means and said planet moving means.

18. A planetarium as claimed in claim 4 further comprising a second body representing a satellite supported and moved by said supporting and moving means and wherein said supporting and moving means comprises a controllable rotational motive power means for rotating said planet representing body about said sun representing means and a gearing arrangement including two power paths, the first one of which transmits rotational motive power to said planet and satellite representing bodies at a first speed to drive said planet representing body in rotation about said planet representing body and the second one of which transmits rotational motive power at a slower speed to drive said planet representing body in slow rotation and maintain said predetermined axis directed at a single point on said sphere.

19. A planetarium as claimed in claim 18, further comprising means for effecting nodal travel of the satellite orbit and wherein rotational motive force for such nodal travel is transmitted through said second power path of said gearing arrangement.

20. A planetarium as claimed in claim 19 wherein said gearing arrangement transmits motive force from an input shaft by means of a pinion and a gear to a through-shaft and from the latter on the one hand by means of a pair of gears to a first intermediate shaft and from the latter by means of another pair of gears to a second intermediate shaft and from there both to a gear loosely mounted on the through-shaft and comprising an attachment extending upwardly and carrying the support for the planet axis, and to a gear mounted on the attachment of this gear coaxially to the through-shaft and carrying an auxiliary moon path; and on the other hand the drive force is transmitted from the through-shaft, by means of a gear keyed to it about the support carrying the planet axis, to a gear which meshes with a gear rotating the planet about its axis and which is carried by a shaft arranged eccentrically on the support of the planet axis and extending through the suport downwardly and carrying at its lower end a gear which meshes with a gear arranged coaxially to the through-shaft and driving a toothed rim which is movable with respect to the auxiliary moon path and carrying the moon.

21. A planetarium as claimed in claim 18, further comprising means supporting said sun representing means and wherein said means for supporting said planet body comprises a supporting arm secured to and extending radially outwardly of said means for supporting the sun representing means, said supporting arm including a flexible shaft which is in drive connection with said gearing.

22. A planetarium adapted to optionally illustrate a selected one of three views, namely a view of a universal aspect of the fixed stars, a view of solar system operations and illumination against a solar system aspect of the fixed stars, and a projected view of such operations and aspect as shadow images against a light field on a projection surface, the planetarium comprising:

a hollow sphere having a darkened thin wall with predetermined limited light permeability characteristics rendering said wall, when opposing surfaces thereof are lighted with disparate levels of illumination, substantially transparent from the surface of lower incident light and substantially opaque from the surface of higher incident light, opaque means on the inner surface of said sphere wall representing a solar system aspect of the fixed stars, opaque means on the inner surface of said sphere wall representing a universal aspect of the fixed stars, means supported centrally of said sphere representing the sun and including a controllable light source means and a diffusing cover normally positioned enclosing said light source means, said light source means emitting light from a relatively small volume so as to approximate a point source, control means operatively connected to said light source means for controlling the emission of light therefrom, a body representing a planet, means for supporting said planet representing body within said sphere intermediate said wall and said sun representing means and for controllably moving said planet representing body along a predetermined path of travel about said sun representing means, and control means operatively connected to said body supporting and moving means for controlling the movement of said planet representing body thereby, the limited light permeability of said wall being such that said sphere, when no light is emitted from said light source means and as viewed from the exterior, gives the impression of a black substantially opaque globe and said outer surface star representing means thereby illustrates a universal aspect of the fixed stars; said wall being substantially transparent when light is emitted from said light source means so that said inner surface star representing means and said planet representing body illustrate solar system operations and illumination against a solar system aspect of the fixed stars; and said light source means, when said diffusing cover is removed therefrom, projects shadow images of elements interposed between said exposed light source means and the exterior of said sphere outwardly of said sphere.

References Cited

UNITED STATES PATENTS

| | | | |
|---|---|---|---|
| 1,770,820 | 7/1930 | Tomasevich | 35—45 |
| 2,112,314 | 3/1938 | Spandau. | |
| 2,358,075 | 9/1944 | Kissinger | 35—47 |
| 2,379,468 | 7/1945 | Arnold | 35—46 |
| 3,050,888 | 8/1962 | Myers et al. | 40—219 X |
| 3,292,287 | 12/1966 | Marn | 40—219 X |
| 3,303,582 | 2/1967 | Farquhar | 35—47 |

FOREIGN PATENTS 353,679  10/1922  Germany.

OTHER REFERENCES

Farquhar, Farquhar Transparent Globes, advertising leaflet, 6 pages. Copy in group 330, received May 5, 1964.

JEROME SCHNALL, Primary Examiner

U.S. Cl. X.R.

35—42.5, 47; 40—219

UNITED STATES PATENT OFFICE
CERTIFICATE OF CORRECTION

Patent No. 3,520,073          Dated July 14, 1970

Inventor(s)    Klaus Baader

It is certified that error appears in the above-identified patent and that said Letters Patent are hereby corrected as shown below:

Column 2, line 3 "characterstcs" should be --characteristics--; "partcular" should be --particular--.
Column 9, line 23 "n" should be --in--.
Column 12, line 58 "inner" should be --outer--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents